United States Patent
Giebel et al.

(10) Patent No.: US 8,615,333 B2
(45) Date of Patent: Dec. 24, 2013

(54) DRIVER ASSISTANCE SYSTEM AND OPERATOR CONTROL CONCEPT THEREFOR

(75) Inventors: Tobias Giebel, Wolfsburg (DE); Thomas Eigel, Berlin (DE); Jiri Jerhot, Braunschweig (DE); Carsten Semmler, Cremlingen (DE)

(73) Assignee: Volkswagen AG, Wolfsburg (DE)

(*) Notice: Subject to any disclaimer, the term of this patent is extended or adjusted under 35 U.S.C. 154(b) by 122 days.

(21) Appl. No.: 12/997,220

(22) PCT Filed: Jun. 9, 2009

(86) PCT No.: PCT/EP2009/004139
§ 371 (c)(1),
(2), (4) Date: Apr. 20, 2011

(87) PCT Pub. No.: WO2009/149895
PCT Pub. Date: Dec. 17, 2009

(65) Prior Publication Data
US 2011/0190961 A1    Aug. 4, 2011

(30) Foreign Application Priority Data

Jun. 11, 2008 (DE) .......... 10 2008 027 737
Apr. 15, 2009 (DE) .......... 10 2009 017 154

(51) Int. Cl.
*G06F 17/00* (2006.01)

(52) U.S. Cl.
USPC .............................. 701/1; 701/36

(58) Field of Classification Search
USPC ........ 701/1, 36, 41, 70, 48, 96, 300; 180/170; 342/70
See application file for complete search history.

(56) References Cited

U.S. PATENT DOCUMENTS

| 6,945,346 B2 * | 9/2005 | Massen ................. 180/170 |
| 2007/0043491 A1 * | 2/2007 | Goerick et al. ............. 701/41 |
| 2007/0213905 A1 * | 9/2007 | Funk et al. ............... 701/45 |

FOREIGN PATENT DOCUMENTS

| DE | 102004009308 A1 | 9/2005 |
| EP | 1356979 A | 10/2003 |
| GB | 2403027 A | 12/2004 |
| WO | WO 03/058359 A | 7/2003 |

OTHER PUBLICATIONS

Foreign language PCT International Search Report issued by the ISA/EP in connection with PCT/EP2009/004139 and completed on Aug. 21, 2009.
English translation of the PCT International Search Report issued in connection with PCT/EP2009/004139 and completed on Aug. 21, 2009.
Foreign language International Preliminary Report on Patentability issued in connection with PCT/EP2009/004139.
English translation of the International Preliminary Report on Patentability issued in connection with PCT/EP2009/004139.

* cited by examiner

*Primary Examiner* — Marthe Marc-Coleman
(74) *Attorney, Agent, or Firm* — Barnes & Thornburg LLP

(57) ABSTRACT

A driver assistance system having a predefined number of driver assistance functions has a device for defining, storing and implementing a predefined number of driver assistance packages, wherein each driver assistance package comprises one or more driver assistance functions and each driver assistance package has a predetermined functional scope.

16 Claims, 2 Drawing Sheets

DRIVER ASSISTANCE SYSTEM AND OPERATOR CONTROL CONCEPT THEREFOR

CROSS REFERENCE TO RELATED APPLICATIONS

This application is a U.S. national counterpart application of international application serial No. PCT/EP2009/004139 filed Jun. 9, 2009, which claims priority to German Patent Application No. 102008027737.1 filed Jun. 11, 2008 and to German Patent Application No. 102009017154.1 filed Apr. 15, 2009. The entire disclosures of PCT/EP2009/004139, DE 102008027737.1 and DE 102009017154.1 are hereby incorporated by reference.

FIELD

The invention relates to a driver assistance system according to the preamble of claim 1 and to a method for performing operator control of a driver assistance system, i.e. an operator control concept according to the preamble of claim 7.

BACKGROUND

In the last few years, driver assistance systems have been increasingly made available to a broad user base. These systems assist drivers in performing the functions of controlling a vehicle and the intention is that in the future they will significantly improve comfort and safety in road traffic. The development of more efficient and at the same time more cost-effective sensors has enabled the field of application of driver assistance systems to be widened. This usually involves a division into longitudinal control systems and lateral control systems.

The Adaptive Cruise Control (ACC) driver assistance system assists drivers in performing the vehicle longitudinal control function. Originally, such systems were developed for use on freeways and high-quality country roads with a high speed potential. It has also been possible to extend the field of application of modern ACC systems to the low speed range and to follow-on mode travel as far as a stationary state.

In a way which is comparable to longitudinal control assistance, a driver can also be assisted by an assistance system in the performance of the lateral control function. If the area which can be traveled on is detected by a suitable sensor system, the assistance can be provided in a plurality of stages. The functionality of already available systems extends here from simple messages (Lane Departure Warning, LDW) to assisting steering interventions in situations in which the vehicle is about to exit the lane (for example "Lane Assist" in the VW Passat CC). These assistance systems orient themselves by using the lane markings which are usually sensed by means of monocular video sensor systems.

Document DE 103 43 178 A1 discloses a driver assistance system for motor vehicles which has a sensor system for sensing the traffic environment and a controller for controlling the acceleration of the motor vehicle in accordance with a predetermined longitudinal control strategy, wherein a strategy module determines in a variable fashion the longitudinal control strategy which is to be applied. In this context, the driver can use an input device to select between a number of predefined longitudinal control strategies, for example comfort, normal or dynamic, and to adapt the system behavior of the driver assistance system in accordance with his requirements.

SUMMARY

Although, in the known driver assistance systems, the driver can optionally select the strategy of longitudinal control, the functional scope of the driver assistance system is usually essentially prescribed. However, owing to the multiplicity of driver assistance functions which are available in a vehicle, the driver can lose his overview of the functional scope of the driver assistance system.

Disclosed embodiments are therefore based on the object of providing a driver assistance system and an operator control concept for such a driver assistance system, and this ensures the necessary transparency for a driver.

This object is achieved by a driver assistance system having the disclosed features and by a method for performing operator control of such a driver assistance system having the disclosed features.

BRIEF DESCRIPTION OF THE FIGURES

The disclosed embodiments are explained with reference to the following figures and textual description wherein.

DETAILED DESCRIPTION

Figure 1:
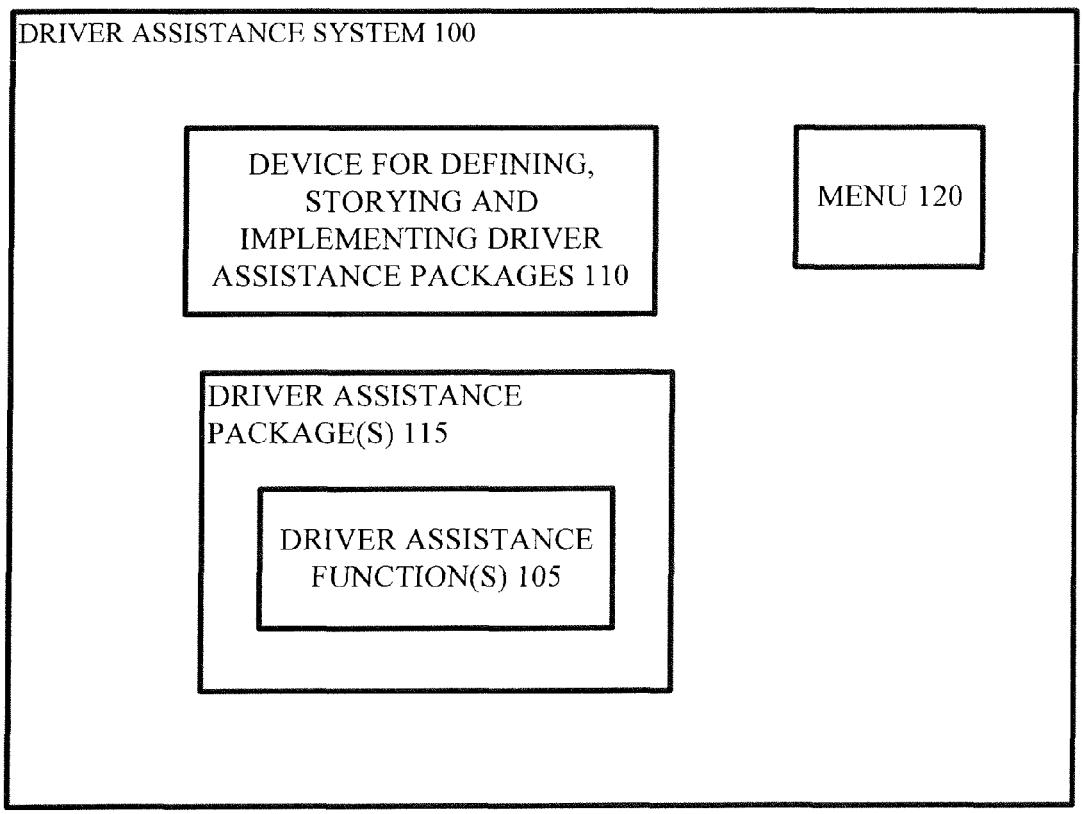
FIG. 1 is a figure illustrating a system designed in accordance with the disclosed embodiments.

As illustrated in FIG. 1, the driver assistance system 100 according to the disclosed embodiments comprises a predefined number of driver assistance functions 105, wherein the driver assistance system 100 has a device 110 for defining, storing and implementing a predefined number of driver assistance packages 115, so that each driver assistance package 115 comprises one or more driver assistance functions 105, and each driver assistance package 115 has a predetermined functional scope.

The basic concept of the disclosed embodiments is that the multiplicity of all the possible assistance functions 105 are combined in a suitable way into packages 115 which have a certain level of the degree of assistance and certain system limits (for example requirements made of the predictive range of the means for sensing the surroundings). The FAS packages 115 can be predefined and, depending on the configuration, the offered packages 115 and/or the portfolio of the possible FAS functions 105 which are contained in each package 115 can be defined using a menu 120 (for example, in a stationary state by means of the MFA).

The functional scopes of the driver assistance packages may be matched to one another in such a way that there is a driver assistance package with a minimum functional scope and a driver assistance package with a maximum functional scope.

The functional scopes of the assistance packages are based on one another in such a way that an assistance package with a relatively large functional scope at least partially comprises the assistance packages with a relatively small scope. In other words, it is possible to see the packages as having a hierarchical arrangement, i.e. the packages form in terms of their scope a sequence i=1 to n, wherein the functional scope of the i-th package is a component of the functional scope of the (i+1)-th package. However, other configurations of the packages in which the packages would be defined by means of the context, that is to say for example according to the type of road, speed and/or traffic density, are also possible.

The driver assistance packages may be defined by the surroundings detection means which are used. This means that the package with the smallest functional scope has, for example, no new surroundings detection means, the next higher package has a surroundings detection means by means of ultrasonic sound, the next package has a surroundings detection means by means of ultrasonic sound and radar, and the highest package has a surroundings detection means by means of ultrasonic sound, radar and camera.

Furthermore, the driver assistance packages may be defined by the degree of support, i.e., how far the assistance package assists the driver and intervenes in the events on the road.

In a further disclosed embodiment, the driver can himself determine the driver assistance functions of each driver assistance package using a menu and, therefore, put together the individual packages. However, this assumes that the driver is, in principle, experienced.

Figure 2:
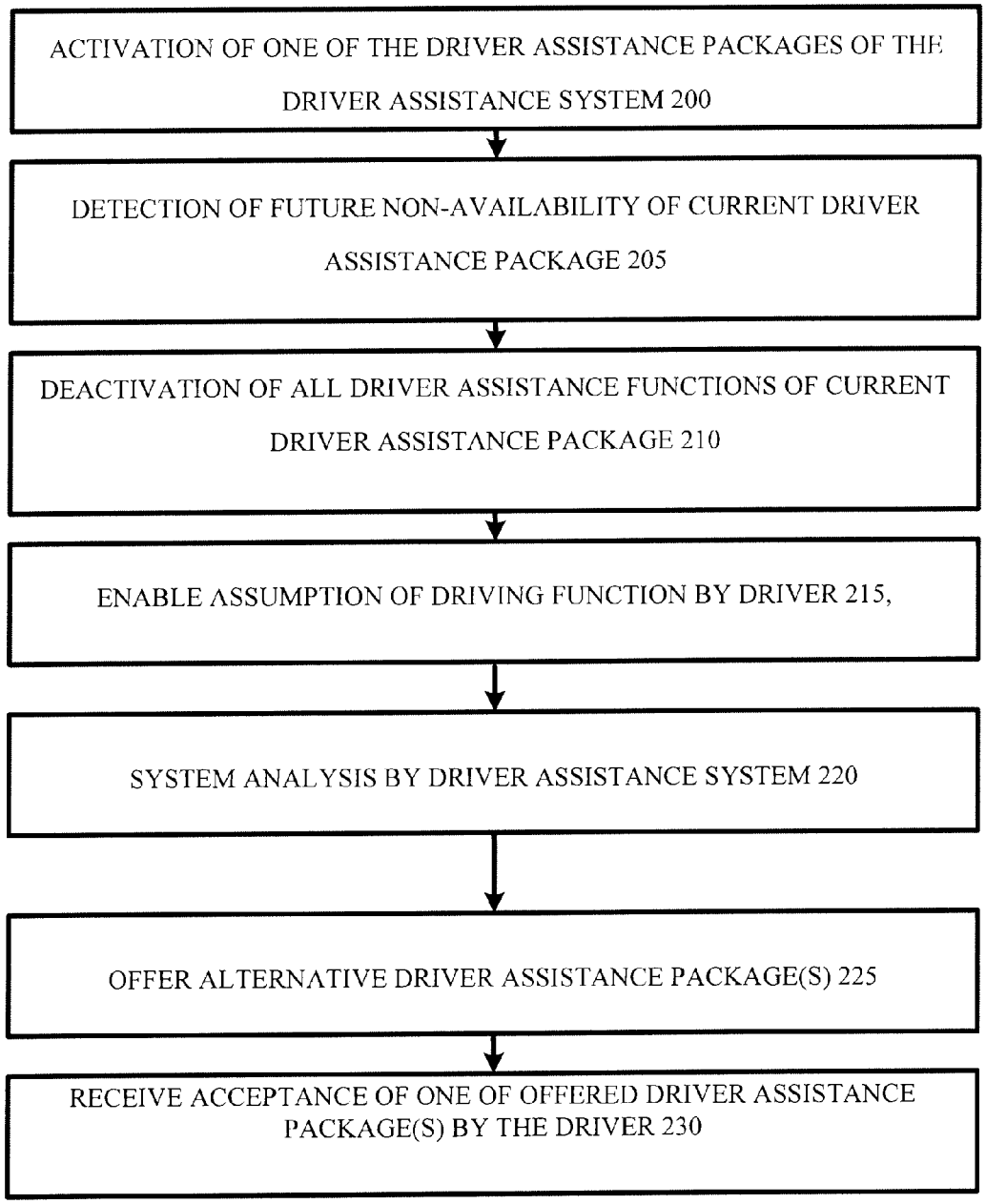
FIG. 2 is a figure illustrating a method provided in accordance with the disclosed embodiments.

As illustrated in FIG. 2, in the method according to the disclosed embodiments for operating a driver assistance system begins at 200, wherein one of the driver assistance packages of the driver assistance system is activated. The method has the following further operations:

detection (at 205) of the future non-availability of the current driver assistance package, deactivation (at 210) of all the driver assistance functions of the current driver assistance package, assumption (at 215) of the driving function by the driver, system analysis (at 220) by the driver assistance system, offering (at 225) of an alternative driver assistance package or of a plurality of alternative driver assistance packages to the driver, and acceptance (230) of the one offered driver assistance package by the driver or selection of one of the offered driver assistance packages by the driver.

If the one offered driver assistance package is rejected by the driver, the driver assistance system may submit a further proposal of an alternative driver assistance package to the driver.

In particular, the driver assistance system can select the alternative driver assistance package on the basis of the functional scope, wherein either the maximum instantaneously possible functional scope or an instantaneously possible functional scope which is adapted to the traffic situation can be selected.

In a further disclosed embodiment, the driver assistance packages with a currently available functional scope are offered to the driver as alternative driver assistance packages, wherein the driver can then select, using an input device, the assistance package which is preferred by him.

Disclosed embodiments will be explained below with reference to examples.

The starting point of the disclosed embodiments involves driver assistance systems (FAS) and automatic driving functions, i.e., in a borderline case it may also include systems for automatic vehicle control without active involvement by the driver.

An essential basic concept is, as already explained above, that the multiplicity of all the possible assistance systems are combined in a suitable way into packages which have a certain level of the degree of assistance and certain system limits (for example requirements made of the predictive range of the means for sensing the surroundings). The FAS packages can be predefined and, depending on the configuration, the offered packages and/or the portfolio of the possible FAS functions which are contained in each package can be defined using a menu (for example in a stationary state by means of the MFA).

For example, the following packages can have been defined for the longitudinal control:

Package 1: GRA (Geschwindigkeitsregelanlage [Speed control system], no surroundings detection means necessary), Package 2: ACC Stop and Go (surroundings detection means via ultrasonic sound), Package 3: ACC from 30 km/h without intelligent speed adaptation (surroundings detection means via radar), and Package 4: ACC from 30 km/h with intelligent speed adaptation to, for example, the radius of a bend and speed limits (surroundings detection means via radar and camera).

In each package there can be different influencing patterns which can lead to different types of behavior of the basic function. For example, the speed adaptation is not implemented in bends in package 3.

The operator control concept according to the disclosed embodiments or the method for operating the driver assistance system comprises, in this example, the sequence which is described below, wherein the starting point for the consideration is that an FAS package is activated and it assists the driver in controlling the vehicle. The activated package may be, for example, package 4.

The system detects that the current functional scope of the activated FAS package will shortly no longer be able to be offered because, for example, a number of driver assistance functions are no longer available since the system limits of the individual functions have been exceeded. It is therefore possible for the camera-based lane detection function to have failed in the example.

The system initiates assumption of control by the driver so that all the FAS functions can be reliably deactivated. In the example, the ACC from 30 km/h with intelligent speed adaptation is deactivated.

The driver assumes the driving function and the assistance system analyzes the system status.

The driver is offered, from the multiplicity of possible FAS packages, that package with the greatest functional scope which is currently available, or with the functional scope which is most appropriate for the traffic situation and which is currently available. In the example, he is offered package 3 since "ACC from 30 km/h without intelligent speed adaptation" is also possible without lane information or speed limit information.

The driver confirms the offered functional scope or the package via the SET key, and the FAS functions are activated. In the example, the driver confirms "ACC from 30 km/h without intelligent speed adaptation" and carries on the journey.

The system detects that the new current functional scope of the current FAS package will also shortly no longer be able to be offered since the brake control unit is signaling a malfunction.

The system initiates assumption of control by the driver so that all the FAS functions can be reliably deactivated. In the example, the ACC from 30 km/h without intelligent speed adaptation is deactivated.

The driver assumes the driving function and the assistance system analyzes the system status.

The driver is offered, from the multiplicity of FAS packages, that package with the largest functional scope which is currently available, or with the functional scope which is most appropriate for the traffic situation and which is currently available. In the example, he is offered package 1 since "GRA" is also possible without surroundings detection means or braking intervention.

The driver confirms the offered functional scope or the package via the SET key, and the FAS functions are activated. In the example, said driver confirms "GRA" and continues the journey.

If the driver rejects an offer of assistance and therefore no assistance is active, said driver can at any time request a current offer by pressing once on the SET key and, if appropriate, can select said current offer by pressing once more on the SET key. When the assistance is activated, this is displayed to him after the SET key has been pressed.

The offer for the respective assistance can be made visually or acoustically by a voice output. The selection and confirmation on the part of the driver can be made by means of conventional operator control elements such as a switch, pushbutton key, touchscreen or by voice dialog.

An alternative configuration would be to offer all the possible assistance packages which are possible in the respective context, i.e. type of road, speed, traffic density. The driver could then select an option therefrom and activate it by means of corresponding operator control elements.

The invention claimed is:

1. A driver assistance system having a predefined number of driver assistance functions, the system comprising:
   a device defining, storing and implementing a predefined number of driver assistance packages,
   wherein each driver assistance package comprises one or more driver assistance functions, and each driver assistance package has a predetermined functional scope, and
   wherein the driver assistance system detects a future non-availability of a current driver assistance package, deactivates all the driver assistance functions of that current driver assistance package, and enables assumption of the driving function by the driver, performs system analysis to select and offers an alternative driver assistance package or of a plurality of alternative driver assistance packages to the driver.

2. The driver assistance system of claim 1, wherein functional scopes of the driver assistance packages are matched to one another such that there is a driver assistance package with a minimal functional scope and a driver assistance package with a maximum functional scope.

3. The driver assistance system of claim 1, wherein functional scopes of the assistance packages are based on one another so that an assistance package with a relatively large functional scope at least partially comprises the assistance packages with a relatively small scope.

4. The driver assistance system of claim 2 or 3, wherein the driver assistance packages are defined based on surroundings detection means which are used by the driver assistance packages.

5. The driver assistance system of claim 2 or 3, wherein the driver assistance packages are defined based on a degree of assistance provided by the driver assistance packages.

6. The driver assistance system of claim 1, wherein the driver assistance functions of each driver assistance package are determined based on selection received using a menu.

7. The driver assistance system of claim 1, wherein the system receives an indication of an acceptance of the one offered driver assistance package by the driver or selection of one of the offered driver assistance packages by the driver.

8. The method of claim 1, wherein the driver assistance functions of each driver assistance package are determined based on selection received using a menu.

9. A method for performing operator control of a driver assistance system comprising a device that defines, stores and implements a predefined number of driver assistance packages, wherein each driver assistance package comprises one or more driver assistance functions, and each driver assistance package has a predetermined functional scope, the method comprising:
   detecting a future non-availability of a current driver assistance package based on detection performed by at least one detector utilized by the driver assistance system;
   deactivating all the driver assistance functions of the current driver assistance package provided by the driver assistance system;
   enabling assumption of control of the driving function from the driver assistance system by the driver;
   performing system analysis by the driver assistance system;
   offering of an alternative driver assistance package provided by the driver assistance system or of a plurality of alternative driver assistance packages provided by the driver assistance system to the drivel; and
   receiving an indication of an acceptance of the one offered driver assistance package by the driver or selection of one of the offered driver assistance packages by the driver via an operator control element of the driver assistance system.

10. The method of claim 9, wherein, if the one offered driver assistance package is rejected by the driver, the method further comprises submitting a further proposal of an alternative driver assistance package to the driver.

11. The method of one of claims 9 and 10, further comprising selecting the one alternative driver assistance package based on the functional scope of the driver assistance package, wherein either a maximum instantaneously possible functional scope or an instantaneously possible functional scope specific to the traffic situation is selected.

12. The method of one of claims 9 and 10, further comprising offering the driver assistance packages with a currently available functional scope to the driver as alternative driver assistance packages.

13. The method of claim 9, wherein functional scopes of the driver assistance packages are matched to one another such that there is a driver assistance package with a minimal functional scope and a driver assistance package with a maximum functional scope.

14. The method of claim 9, wherein functional scopes of the assistance packages are based on one another so that an assistance package with a relatively large functional scope at least partially comprises the assistance packages with a relatively small scope.

15. The method of claim 9, wherein the driver assistance packages are defined based on surroundings detection means which are used by the driver assistance packages.

16. The method of claim 9, wherein the driver assistance packages are defined based on a degree of assistance provided by the driver assistance packages.

* * * * *